May 28, 1935. P. L. GEER ET AL 2,002,889
SUCTION GLASS GATHERING DEVICE
Filed April 7, 1932 6 Sheets-Sheet 2

INVENTORS
Paul L. Geer
Harold A. Moore and
William A. Morton
BY William B. Jaspert
ATTORNEY

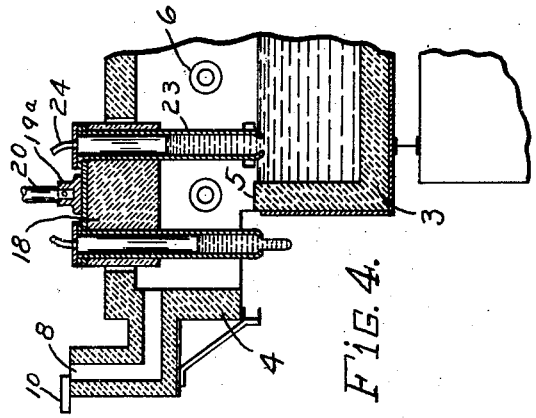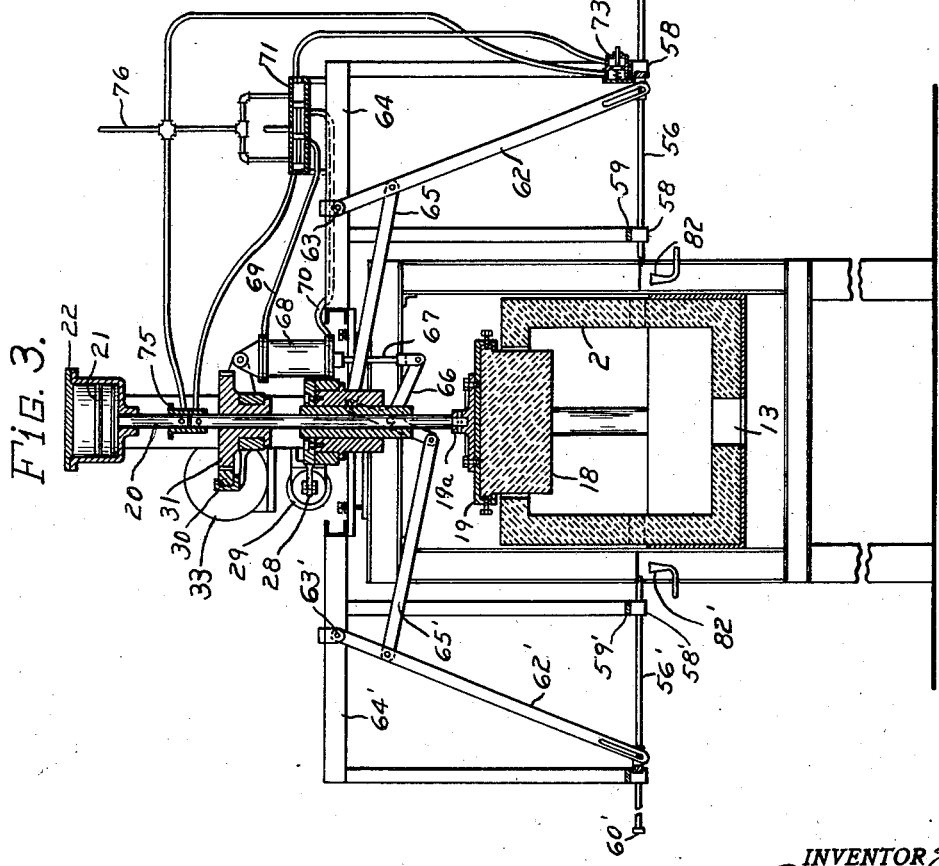

May 28, 1935.  P. L. GEER ET AL  2,002,889
SUCTION GLASS GATHERING DEVICE
Filed April 7, 1932   6 Sheets-Sheet 4

INVENTORS
Paul L. Geer
Harold A. Moore
William A. Morton
William B. Jaspert
BY
ATTORNEY May 28, 1935. P. L. GEER ET AL 2,002,889
SUCTION GLASS GATHERING DEVICE
Filed April 7, 1932 6 Sheets-Sheet 5
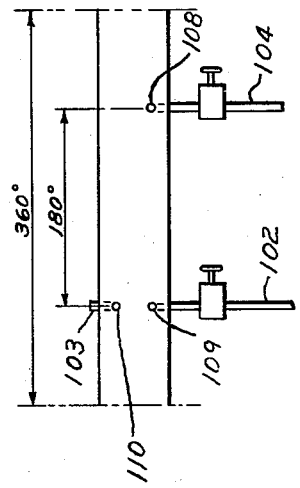
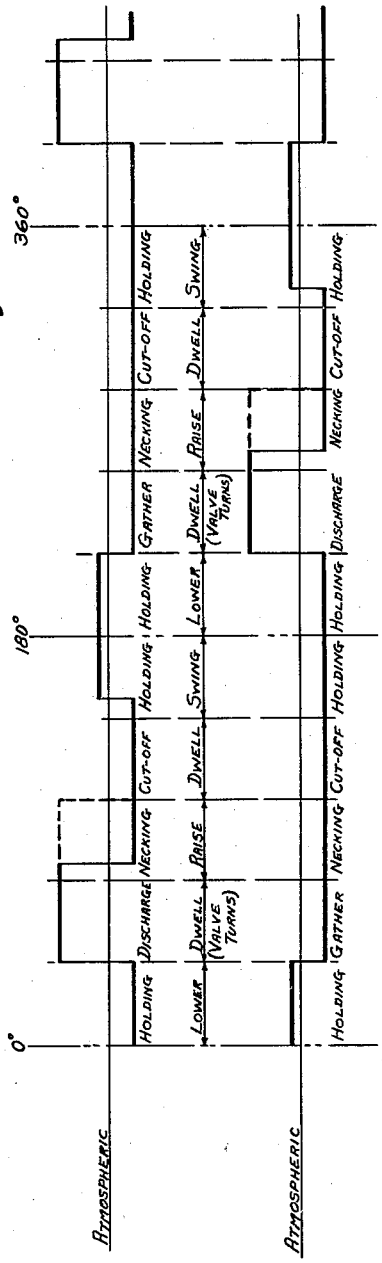
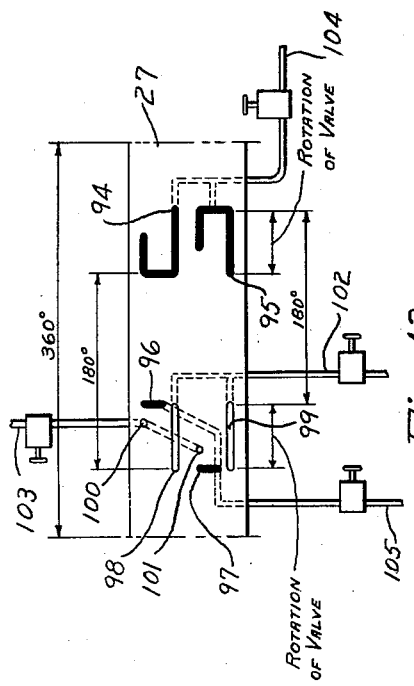
INVENTORS
Paul L. Geer
Harold A. Moore and
William A. Morton
BY
William B. Jaspert
ATTORNEY

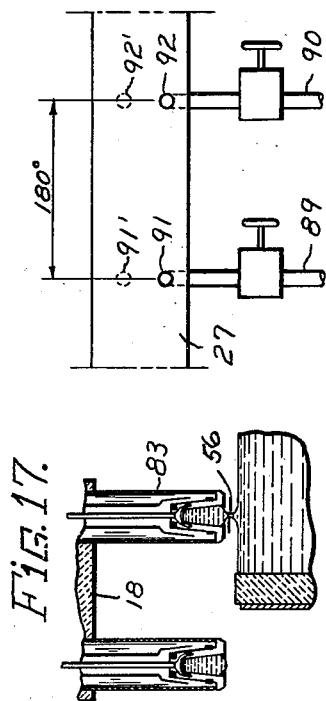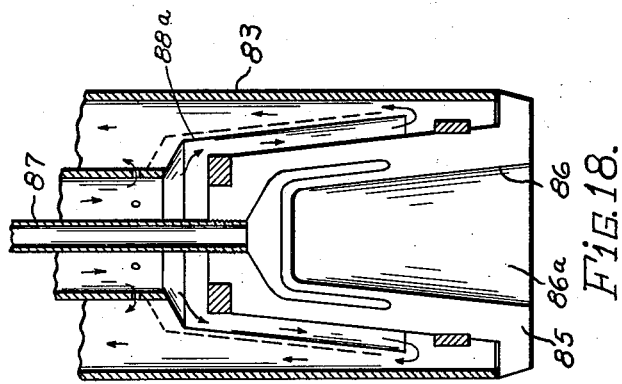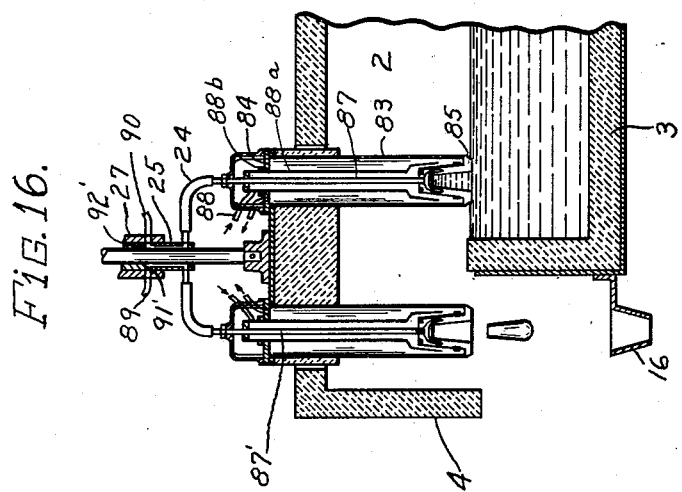

Patented May 28, 1935

2,002,889

UNITED STATES PATENT OFFICE 2,002,889

SUCTION GLASS GATHERING DEVICE

Paul L. Geer, Bellevue, Harold A. Moore, Wilkinsburg, and William A. Morton, Pittsburgh, Pa.

Application April 7, 1932, Serial No. 603,736

28 Claims. (Cl. 49—55)

This invention relates to the method of and apparatus for segregating mold charges from a mass of molten glass for ware forming machines and it is among the objects thereof to provide means whereby the segregated mold charges will be delivered at proper and uniform temperatures and in regulable and constant quantities whereby the quality and weight of glassware may be uniformly maintained.

The invention also contemplates the provision of operating mechanism embodying simple and positive control means adjustable in operation to obtain the regulation of size and shape of the segregated mold charges; and the invention further contemplates the provision of feeding apparatus which shall deliver mold charges of a variable range of sizes and in a minimum period of time to render the feeding apparatus highly effective and responsive to the speed of the ware forming machine to which the charges are to be supplied.

The present invention utilizes the gathering feature of the suction type of feeder in which the mold charges may be measured by a suction mold and segregated from the glass mass by cutting means, without, however, exposing the glass mass from which the charges are drawn to the atmosphere, the invention providing for maintaining the hot glass supply in a container which may be heated to thermally condition the glass therein as in the well known impulse and needle types of feeders.

In accordance with the present invention, a measured quantity of glass is segregated from the supply mass and thereafter it may be completely discharged into a mold or it may be subdivided to produce a measured quantity which is charged into a mold at regularly timed intervals.

These and other objects of the invention will become more apparent from a consideration of the accompanying drawings constituting a part hereof in which like reference characters designate like parts and in which:

Figure 1 is a sectional elevational view of a forehearth structure of a glass melting tank equipped with glass feeding mechanism embodying the principles of this invention;

Figure 2 a top plan view of the feeding mechanism showing a portion of the forehearth and diagrammatically illustrating a portion of a glass forming machine;

Figure 3 is a cross sectional view partially in elevation of the feeding mechanism of Figure 1;

Figure 4 is a cross sectional view of a modified form of forehearth in which the feeder may be atmospherically exposed during the delivery of the gob;

Figure 1:
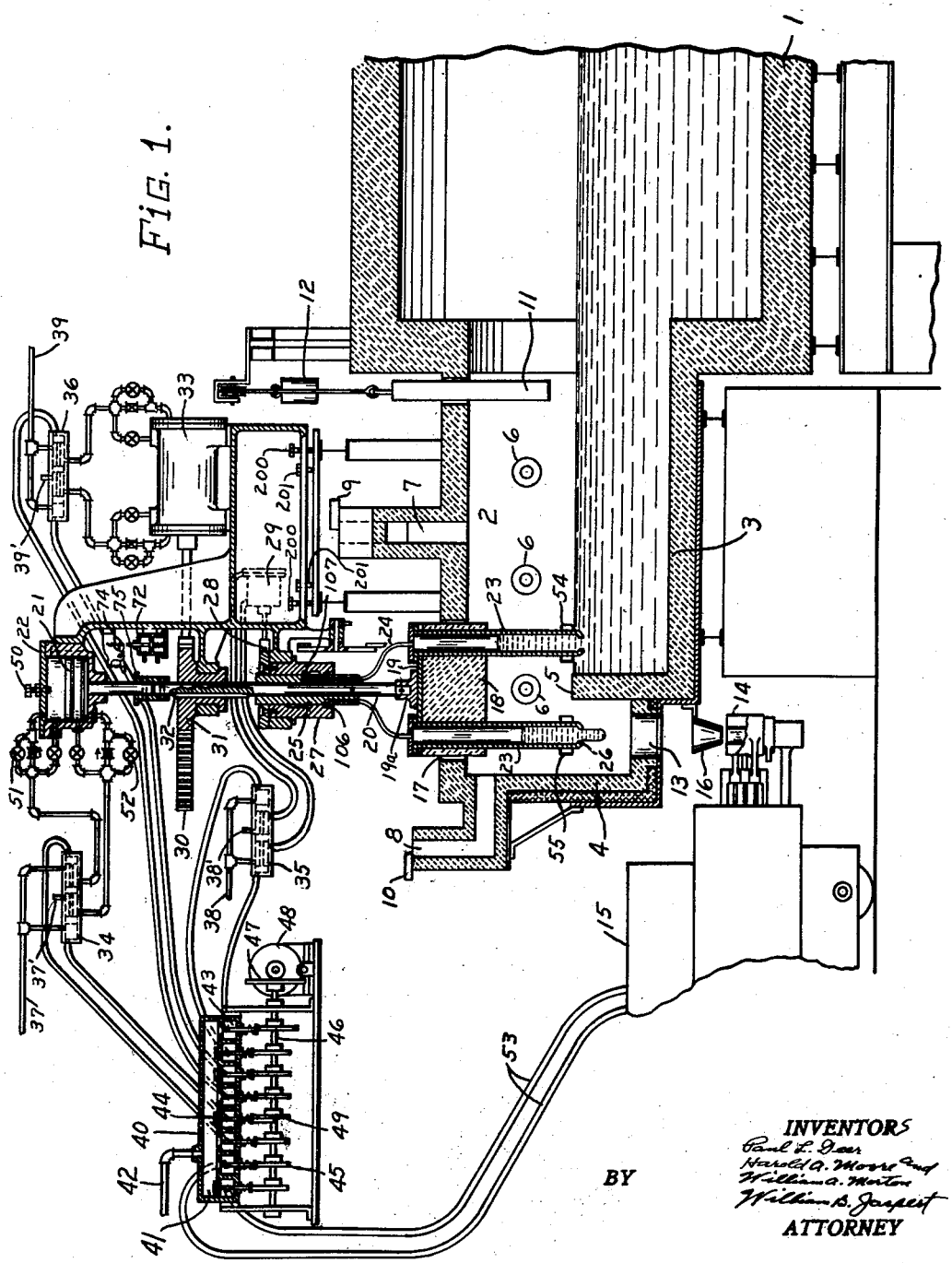
Figure 20:
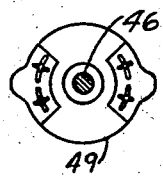
Figure 9:
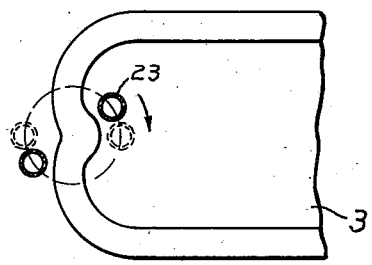
Figure 10:
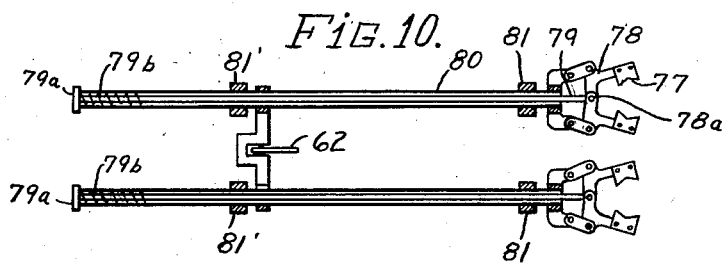
Figure 11:
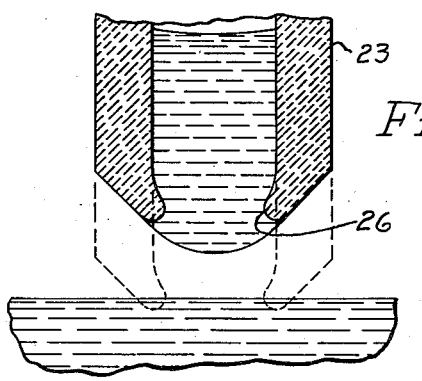

Figures 5 to 8 inclusive are cross sectional views illustrating the function of the feeder mechanism in segregating charges from the glass mass and subsequently segregating mold charges therefrom;

Figure 9 is a top plan view of a portion of a forbay graphically illustrating the movement of the glass feeding device;

Figure 10 is a top plan view of a modified form of shearing mechanism employed in severing the segregated glass from the supply mass and the extruded glass for the mold charges;

Figure 11 is an enlarged cross-section of the end of the feeding implement;

Figure 12 is a diagrammatic view of the valve mechanism controlling the suction and pressure of the feeding mechanism;

Figure 13 a view in perspective of the feeder valve cylinder;

Figure 14 a diagrammatic illustration of a modified form of control valve cylinder;

Figure 15 a chart illustrating the operating characteristics of the feeder;

Figures 16 and 17 cross sectional views of a modified form of feeding implement;

Figure 18 an enlarged detail view thereof in cross-section;

Figure 19 a diagram of the operating valve employed with the feeder shown in Figures 16 and 18; and, Figure 20 an end elevational view of an adjustable cam embodied in the mechanism of Figure 1.

With reference to Figures 1 to 4 inclusive of the drawings, the structure therein illustrated comprises a glass melting tank a portion of which is designated by the reference character 1 having a forehearth generally designated at 2, a forbay 3, and an extension wall 4 extending beyond the end wall 5 of the forbay. Burner ports 6 may be provided in the forehearth and at the end of the forbay to heat the chambers to substantially the working temperature of the glass, and flues 7 and 8 having dampers 9 and 10 respectively may be provided to regulate the flow of the products of combustion for regulation of temperatures in the forehearth and the end chamber formed by the wall 4. A vertically movable gate 11 is provided between the glass melting tank 1 and the forehearth 2, the gate being provided with a counter weight 12 to make it readily adjustable.

The end chamber constituted by the extension wall 4 has a perforated bottom with an opening 13 through which glass is discharged into the mold 14 of a ware forming machine designated by the reference character 15. A guide 16 may be employed to center the glass gobs with the mold orifice, or to arrest the speed of the falling glass mass before it enters the mold.

The roof of the forehearth is provided with an opening 17 through which the feeder implement 18 extends to the interior of the forehearth and end chamber.

The feeding implement 18 consists of a refractory block supported in a casting 19 which is secured by means of holder 19—a to the end of a plunger 20, the other end of which is connected to a piston 21 operative in a cylinder 22.

The block 18 supports a pair of cylindrical feeding tubes 23, the upper ends of which are closed and connected by conduits 24 to a valve 25. The bottom of the feeding tubes 23 may be provided with inwardly projecting lips 26 as shown in Figure 11 of the drawings. The lip or shoulder forms a constricted orifice which supports the glass mass in the tube and aids in the shaping of the glass gobs as will be hereinafter explained.

Valve 25 is movable with plunger 20 and cooperates with a rotatable valve cylinder 27 which is more clearly illustrated in Figures 12 to 15 inclusive of the drawings. Valve cylinder 27 is adapted for angular movement by a piston actuated lever 28 that is actuated by a piston disposed in cylinder 29, Figures 1 and 3, and the plunger 20 is similarly adapted for angular movement by a gear rack 30 which interacts with the teeth of a segment gear 31 having a spline connection at 32 with plunger 20, the plunger being movable in the gear segments 31 along its longitudinal axis in accordance with the movement of piston 21. The gear rack 30 is operated by a piston disposed in cylinder 33.

Cylinders 22, 29 and 33 are actuated by fluid pressure controlled by spool valves 34, 35 and 36 respectively, these valve controlling ports connected by conduits 37, 38 and 39 to a source of fluid pressure. The valves 34, 35 and 36 are further provided with vents 37', 38' and 39' and bleed holes to bleed off the operating air.

Spool valves 34, 35 and 36 are controlled by a valve mechanism or master controller generally designated by the reference character 40 which consists of a pressure chamber 41 connected by conduit 42 to a source of pressure and having valved ports communicating with valve chambers 43, the chambers 43 communicating with the common pressure chamber 41 when valves 44 are unseated, the valves being actuated by cams 45, of a common cam shaft 46, which is actuated through a variable speed friction drive reduction 47 and a drive motor 48. The cam 49 controlling valve 34 of the piston cylinder 22 is adjustable, this cam being shown in Figure 20 of the drawings, adjustment being provided to vary the time of dipping of the feeder head as will be hereinafter explained.

The cams 45 of the cam shaft 46 are arranged to actuate valves 34, 35 and 36 in proper timed relation to subject the feeding head to reciprocating movement in a vertical direction to dip the ends of the feeding tube 23 in the glass of the forehearth, to lift the tube clear of the glass mass, to subject the head to angular movement through an angle of 180° and to subject the valve cylinder 27 to angular movement to control the application of pressure and vacuum to the feeding tubes 23 through the ports of valve 25. The cams for controlling the dipping and raising of the implement and the swinging of the valve have two lobes substantially 180° apart, while the cams for controlling the swinging of the implement have only one lobe. Thus one complete revolution of the cam shaft 46 causes two complete gobforming cycles, but only one complete cycle of the implement swinging mechanism.

An adjustable stop screw 50 may be provided in the top of cylinder 22 to limit the travel of piston 21 in its upward movement and valve connections 51 and 52 are provided for controlling the size of opening of the ports in cylinder 22 to vary the speed of movement of the dipping head 18 and to cushion the piston at the ends of its stroke.

The movement of the molds 14 of the glass forming machine 15 is also controlled by the cam mechanism 40 to which it is connected by conduits 53 so that movement of the molds 14 is synchronized with the feeding of glass by the tubes 23. Slotted openings 54 and 55 with complementary opposed openings are provided in the side walls of the forehearth and end chamber, with the path of movement of the feeding cylinder 23 between the complementary openings and glass shearing blades of shears 56, 56' and 57, 57' shown in Figure 2 are mounted to extend through said slotted openings, to sever the glass after the upward movement of the dipping head has been completed.

Shears 56, 56' and 57, 57' are mounted in guides 58 of a supporting frame 59 and are connected at their extended ends by cross members 60. A yoke 61 is provided for pivotally connecting a lever 62 which as shown in Figure 3 is pivoted at 63 to upper frames 64. A link 65 connects lever 62 with a bell crank lever 66 that is actuated by a piston member 67 operatively disposed in the cylinder 68. The shears 56' and 57' are similarly constructed and connected by linkage, designated by prime characters, to the operating crank lever 66 and are rendered simultaneously operative with shears 56 and 57 through actuation of piston member 67.

Cylinder 68 is connected by conduits 69 and 70 to a spool valve 71 which is controlled by a valve 72 Figure 1 and a valve 73 Figure 3. Valve 72 is operated by a trip latch 74 which extends in the path of a collar 75 mounted on plunger 20 to be movable therewith. When the shoulder of collar 75 trips the latch 74, which it does in its upward movement it will open valve 72 to establish pressure on one side of the spool valve to move it to the position where pressure is applied to cylinder 68 to actuate the shears in their cutting movement, and when the shears have reached their innermost cutting position, valve 73 is operated by a stop 73', provided on the cross member 60 of the shears, to communicate pressure from the source 76 to the spool valve to move it in position where pressure is supplied to the actuating cylinder 68 to move piston 67 to the shear retracting position. The shears are positively controlled to operate in response to the reciprocating movement of plunger 20 to project through the slotted openings 54 and 55 of the forehearth side walls to sever the glass, and by movement of the shears, they are actuated to be retracted after they have completed their severing stroke.

Figure 2:
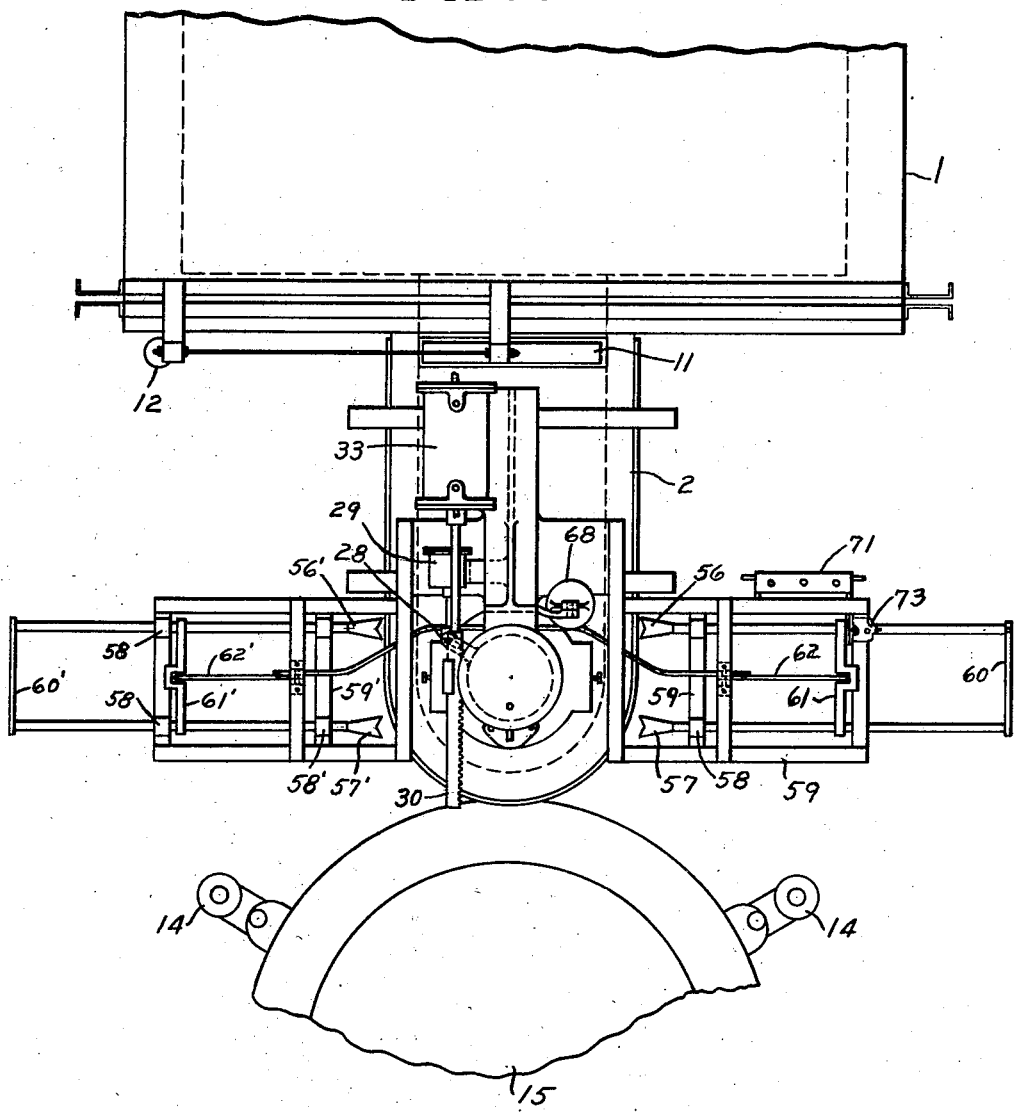

In Figure 10 of the drawings, a modified form of shear mechanism is disclosed which employs a single pair of shears instead of the double acting cooperating shears of Figure 2. In this construction, the cutting blades 77 are mounted on levers 78 which are actuated by a rod 79 extending in a tube 80 which is movable in guides 81, 81' by the operating lever 62 that is actuated in precisely the same manner as the operating mechanism hereinbefore disclosed. As the shears approach the shearing position, collar 79—a on rod 79 is stopped by guide 81', and the final motion of tube 80 causes the shear blades to swing into cutting position about pivot 78—a. The shear blades are normally held out of cutting position by tension spring 79—b, said spring causing the shears to open on the start of the return stroke of tube 80.

As shown in Figure 3, nozzles 82 and 82' are provided below shears 56, 56' and 57, 57' to supply a cooling blast to the blades which prevents the shears from overheating to avoid adhesion of the hot glass to the metal.

In Figure 4 of the drawings, the extension wall 4 does not form an extension chamber to enclose the feeding implement as in Figure 1 of the drawings but is cut short to expose the lower end of the feeding tube in its glass feeding position, this being an alternate form of construction to that shown in Figure 1.

Figure 9 is a top plan view of a portion of the forbay 3 illustrating the swinging path of the feeding tubes 23, the dotted line position of the tubes representing the normal position in which glass is drawn from the mass in the forbay in one tube while the other tube is feeding glass to a mold of the forming machine. The circle represents the path of travel of the feeding tubes, which is through an arc of 180° from the position where the glass is drawn into the tubes to the position where it is delivered to a mold.

Referring to Figures 16 to 18 of the drawings, a different form of feeding tube 83 is employed, the tube being closed by a perforated disc 84. A mold 85 is secured in the tube 83 and is provided with a somewhat tapered inner wall 86. Suction and pressure is applied to the interior of the mold through a tube 87 connected to the valve 25 as shown in Figure 16. A cooling fluid is supplied through conduit 88 which passes down between the baffle 88—a and the exterior of mold 85 and up between the baffle 88—a and tank 83 to maintain the mold at a sufficiently low temperature to prevent adhesion of the hot glass thereto. The baffle 88—a is vertically adjustable as shown by the dotted lines in Figure 18 by means of nut 88—b. The velocity of the cooling fluid past the exterior of the mold may thus be controlled.

With this style of mold, the mold cavity 86—a is filled when vacuum is applied through tube 87, and the complete mold charge is discharged when pressure is applied thereto which occurs when the mold has been swung to the discharge position as shown in Figure 16.

Figure 19 is a development of the valve cylinder 27 to which an air supply and vacuum tube 89 and 90 respectively are connected to supply pressure and vacuum to ports 91 and 92 respectively. The dotted circles 91' and 92' illustrate the position of the ports of valve 25 when the feeding implement is in its lifted position, in which position the air pressure and vacuum are sealed in the molds until the molds have been swung 180° and lowered to their charge and discharge positions.

Figures 12 to 15 inclusive of the drawings illustrate the function of the valve controlling the application of vacuum and pressure to the refractory feeder tubes shown in Figures 1, and 5 to 8 of the drawings. Figure 13 illustrates a form of valve cylinder 27 in which there are L-shaped ports 94 and 95 and slotted ports 96 and 97, these ports being shaded black to represent sources of vacuum. There are further, horizontally disposed slotted ports 98 and 99 and round ports 100 and 101, these ports being the pressure ports which are connected to source of pressure by conduits 102 and 103. The vacuum ports are connected to a source of vacuum by conduits 104 and 105.

Cooperating with the respective ports of valve cylinder 27 are ports 106 and 107 of valve 25, these ports being spaced 180° apart and in staggered relation vertically as is clearly shown in Figure 1 of the drawings. In Figure 14 is shown a modified form of valve cylinder having ports 108, 109 and 110, port 108 being connected to the vacuum line 104, port 109 to pressure line 102, and port 110 to line 103 exhausting to atmosphere.

The operation of valve 25 and valve cylinder 27 for the application of vacuum and pressure is graphically illustrated in Figure 15 and will be explained in connection with the operation of the above described feeding mechanism.

With reference to the type of suction molds illustrated in Figures 16 to 18 of the drawings and with the type of valve shown in the development of Figure 19 of the drawings, the operation of the feeder is as follows:

With pressure connected to conduit 42 of the control valve mechanism 40 and with motor 48 energized, cam shaft 46 will rotate to communicate pressures to spool valves 34, 35 and 36, which control the movements of the feeding implements as follows: Upon application of pressure above the piston 21 in cylinder 22, plunger 20 of the feeder head will be lowered to bring the mold 85, Figure 16, in contact with the molten glass in the forbay 3 and in this downward position, ports 91' and 92' of valve 25 will register with ports 91 and 92 of the valve cylinder 27 with ports arranged as shown in Figure 19, whereby vacuum is applied through port 92' and the tube 87 to mold 85 that is contacting with the glass in the forbay, and pressure is applied through port 91' and tube 87' to the mold which is in the extension chamber to expel the glass contained therein in the form of a gob as shown in Figure 16.

Upon further rotation of the master control valve as effected by cam shaft 46, pressure will be applied to the under side of piston 21 to lift plunger 20 and the connected feeder molds 85. The ports 91' and 92' of valve 25 will then be sealed off by the wall of valve cylinder 27 to hold the vacuum as long as the plunger is in its lifted position.

As the feeding tube 83 lifts from the glass, the shoulder of collar 75 will strike the latch 74 and depress the valve 72 thereby communicating pressure to cylinder 68 of the cut off shears which will move through the slots 54 of the forehearth wall to shear off the attenuated glass. Since as previously explained, the molds 85 shown in Figures 16 to 18 are of metal and adapted to chill the glass, there will be no adhesion of the glass to the mold and the entire contents of the mold is discharged in the form of a gob of the shape of the mold as shown in Figure 16. When utilizing this form of mold it is completely filled by suction when in contact with the glass in the forbay. It is only necessary to shear-off the attenuated glass on the suction mold, and no shearing is required when the gob is discharged from the pressure side of the feeding implement. The shape and size of the mold will determine the weight and shape of the gob which is produced by this type of feeder. After the shears 56 have severed the attenuated glass as shown in Figure 17, the shears are retracted by virtue of the stop 73' on cross bar 60 striking valve 73 to supply pressure to the opposite side of the piston of cylinder 68 for retracting the shears, and at the same time, the master control valve mechanism 40 will have operated to cause the gear rack 30 to swing the plunger 20 and effect rotation of the feeding molds or implements 85 through an angle of 180°. When the feeding molds have been subjected to angular movement, cylinder 22 will again be connected with the fluid pressure to lower the plunger 20 bringing an empty mold in contact with the glass in the forbay 3 and to discharge the gob from the filled suction mold into the mold 14 of the ware forming machine.

With reference to Figure 19, it will be noted that the wall of the valve cylinder 27 will seal-off the ports 91' and 92' of valve 25 when they are out of register with ports 91 and 92 of the pressure and vacuum conduits 89 and 90 respectively, and this seal will be maintained while the feeder head is lifted and swung 180° until it is again lowered to the charging and feeding position at which time the pressures and vacuums in conduits 89 and 90 will be rendered effective to charge one feeding tube and expel the charge from the other as explained above.

With the type of feeding tube as disclosed in Figures 1 and Figures 5 to 8 inclusive of the drawings, the tubes or feeding implements 23 are refractory and are designed to become heated in operation so that the molten glass will adhere thereto. To aggravate this condition the lip 26 is formed on the bottom of the feeding tube to cause the further adhesion of the glass and to maintain the glass column within the feeding tube.

In fact, in operation after the feeding tubes 23 have become heated, the molten glass will adhere to the bottom of the tube and a portion of the outer wall, such adhesion depending upon the depth the tubes are submerged in the molten glass. To vary the amount that the feeding tubes dip in the glass, the entire machine may be raised or lowered with respect to the forbay by means of jack screens 200 and holding down screws 201. Since the shears are raised and lowered with the rest of the machine, slots 54 and 55 are made high enough to provide clearance for the shears within the limit of adjustment of the machine. Such adhesion is advantageous and aids in shaping the glass gob produced upon the application of pressure as will be hereinafter explained.

Figure 5:
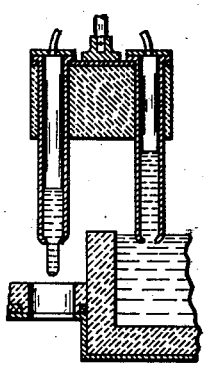

The operation of the heated type of feeding tube 23 will be more clearly understood in connection with Figures 12 to 15 inclusive of the drawings, and particularly the chart of Figure 15 which illustrates the application of pressures and vacuums during the different steps in the charging and feeding operation which occur as follows:

Assuming that the feeder head has dipped to effect contact of the feeding tube 23 with the glass in the forbay 3 and that valve 25 and valve cylinder 27 are connected to the pressure and vacuum conduits 102, 103, 104 and 105 as explained in connection with Figure 12 of the drawings. In this position, the L-shaped ports and the vertical slotted ports 94, 95, 96 and 97, will communicate with the source of vacuum, and ports 106 and 107 of valve 25 will register with these ports as follows: Port 107 of valve 25 will register with the right hand end of the L-shaped port 94 at the upper part of the valve cylinder, and valve port 106 will be in register with the right hand end of the slotted port 99 at the lower part of the valve cylinder and at this instance vacuum is applied to the tube in contact with the molten glass in the forbay, and pressure to the tube in the extension chamber, causing the former to draw up a charge of glass and the latter to apply pressure to the surface of the glass contained therein to cause the same to be extruded in the form of a gob, as shown in Figure 5.

The valve cylinder 27 will then be subjected to angular movement by lever 28 of piston cylinder 29 to bring the valve ports 106 and 107 in register with the opposite ends of the pressure and vacuum slots referred to after which time, the piston 21 will be raised to lift the feeder implement a distance corresponding to vertical base of the L-shaped ports 94 and 95.

Figure 6:
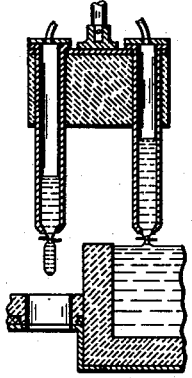
Figure 7:
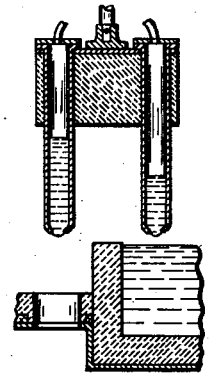
Figure 8:
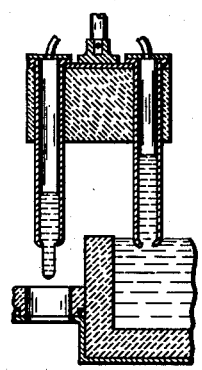

After plunger 20 is lifted, Figure 6, the shears will be projected through slots 54 and 55 to sever the attenuated glass from the suction implement and to sever the gob from the feeding implement by virtue of collar 75 striking the trip mechanism of valve 72 as explained in connection with the metallic type of mold 85 of Figure 16. The implement is then rotated 180° to the position shown in Figure 7, and again dipped to position shown in Figure 8. Figure 5 and Figure 8 are alike except that the tubes 23 have changed places (i. e rotated 180°).

In Figure 15, the bottom line designates one application of pressure and vacuum to one of the feeder implements 23 and the top line the other, these being 180° apart and when one of the feed implements or tubes 23 contacts the glass in the forbay, the bottom line indicates a negative pressure while the top line designates the pressure above atmospheric acting in the other of said implements.

A vacuum or negative pressure on the bottom line is maintained for the gather, and while the feeding tube is in its lower position for gathering glass, valve cylinder 27 is turned as indicated by the center line between the pressure lines in the diagram of Figure 15. The vacuum is maintained while the implement is lifted by virtue of the L-shaped ports 94 and 95, and is also maintained during the subsequent dwell while the implement is being swung through an angle of 180° as the ports 106 and 107 are sealed off by the valve cylinder 27. However, when the feeding tube is lowered, pressure is applied above atmospheric, as shown, during the period marked discharge, and while the implement is reaching its lowermost position. After the shear has severed the extruded portion of the gob as determined by the pressure applied to the surface of the glass contained in the feeding tube, the valve is again rotated and the port of the cylinder that has just expelled its charge passes over port 101 which subjects it to a slight puff of air to extend the glass remaining in the tube to the mouth of the tube so that it protrudes slightly beyond the lip 26 as shown in Figure 11 of the drawings. The purpose of this is to prevent trapping of air and the consequent formation of air bubbles when the mouth of the tube again contacts the molten glass in the forbay 3 after the feed tube has been swung to the gathering position which may be any portion of the arc of the circle between the edge of the container over which the implement rotates and the shearing position 180° from the point where the gob is discharged. As shown by the dark shaded port 97 the vacuum is temporarily applied while the feeding tube is being raised to effect necking of the gob at the initiation of action of the severing mechanism as is common practice in the feeder art.

As shown in Figure 14 of the drawings, a modified form of cylinder sleeve 27 may be employed with the hot feeder tubes, which has the small ports 108, 109 and 110 that function precisely in the manner of the ports described in connection with Figure 19 wherein the inner wall of the cylinder seals off the vacuums and pressures in the feeding tubes while the latter are being swung or raised and lowered as previously explained.

As shown by the dotted lines in Figure 15 the necking of the gobs may be eliminated by merely maintaining the pressures for the time designated by the dotted lines as in all cases it may not be necessary to neck the gob before severing. In this case, the slots 96 and 97 are only round ports on the same vertical lines, but on the same horizontal lines as ports 100 and 101.

It has also been shown that the feeding tube may be lowered into the glass at any point in its orbital path over the container for the purpose of moving the glass during its travel to the shearing position where it is raised and the first shearing operation takes place. This enables the implement to be charged with fresh glass without shear marks.

The shape of the gob produced by the feeder shown in Figures 5 to 8 of the drawings is dependent upon the extruding pressure applied to the surface of the glass in the tube and on the head of the glass, the latter being controlled by the degree of vacuum applied in drawing the glass charges from the forbay. The air pressure for extruding the gob may be varied to change the weight and within certain limits of operation the gob will be essentially cylindrical and an increased pressure will make a longer gob. To vary the degrees of the various pressures and vacuums, the lines 102, 103, 104, 105, 89 and 90 are shown provided with pressure regulators. On account of the fact that the refractory tubes 23 are enclosed in the forehearth and extension chambers, they will be heated to the temperature of the atmosphere above the glass so that the glass gob at the moment of discharge is substantially at the same temperature as that of the glass in the forbay. Temperature control of the glass varies with the forming machine requirement, small light articles requiring hot glass and large heavy articles colder glass, and in the conventional type of feeders, the segregated gobs are being cooled during extrusion and forming and in the present type of feeder absolute temperature control can be obtained by varying the temperature of the glass in the forehearth. Such control can be secured through regulation of burners 6 and by manipulation of dampers 9 and 10 so that most any desired temperature is obtainable for the working of the glass.

Control of the weight and shape of the gob may be obtained in the present type of feeders by inertia force in addition to the control of the head by vacuum and the extrusion by air pressure, such inertia force being produced by the downward movement of the dipping head and the stopping of said downward movement. By subjecting the feeder block 18 to a long dipping stroke and maintaining a constant distance of up stroke, the speed of dipping may be varied. When the dipping head is operated at a slow dipping speed, the air pressure dominates the shape and weight of the gob. Since the suction tube is active while the other tube feeds the glass, the dipping head must at zero dwell at the bottom of its stroke, dip the tube some distance into the glass to allow enough time for the tube to draw its charge of glass, or else a high degree of vacuum may be employed.

At relatively fast speeds of dipping, the inertia of the glass in the feeding tube plays an important part if the tube is stopped suddenly at the bottom of its down stroke. During the first or accelerating part of the down stroke, the downward acceleration tends to counteract the force of gravity. If the tube of glass were freely falling no glass would fall from the tube and the downward acceleration of the tube and glass would be 32.2 feet per second, and the only extruding force is the air pressure acting upon the surface of the glass in tubes. However, at the bottom of the stroke the inertia of the glass tends to carry it downward to produce a gob which lengthens and tends to pull away from the tube. This extrusion effect due to inertia is added to the extrusion effect of the air pressure and gravity and the inertia force increases in direct proportion to the weight of the glass. The extruding effect of the inertia force may be increased by enlarging the feeder tubes and increasing the head or height of the glass in the tube.

It is evident that variations in the character of the gob are effected by the relative speed of reciprocation and dwell periods, and the formation and weight of the gobs may be either entirely controlled by the inertia force, by the force of the air pressure acting upon the surface of the glass in the tube, or by the combination of the inertia force and air pressure.

An essential feature of this device as disclosed is that the gob is severed immediately after the feeding implement is raised, and no appreciable time is allowed for the gob to enlongate due to gravity. The shaping of the gob is effected during its extrusion and not afterwards.

While the foregoing description of the invention illustrates the operation of the feeder, the control of the temperature of the glass before and after extrusion, and the control of the shape and weight of the gob, no attempt has been made to define all of the possibility bearing upon the weight and form of gob which may be influenced in many ways as by the application of heat to the glass as it is being extruded or by utilization of a cooling blast depending upon the extruding conditions desired.

Although an illustrative embodiment of the invention has been herein illustrated and described, it will be obvious to those skilled in the art that various modifications may be made in the details of construction and in the arrangement of the several cooperating parts without departing from the principles thereof.

We claim:

1. Apparatus for segregating mold charges from a mass of molten glass comprising an enclosed forehearth structure having a pool of glass, a division wall supporting the glass and spaced from the end of the structure to form a discharge chamber and a glass pool, said discharge chamber having a discharge orifice, a plurality of feeder tubes adapted to operate simultaneously on each side of the division wall, means for dipping the tubes in the glass, means for applying vacuum to one feeder tube to draw in a charge of glass and for simultaneously applying pressure to the other tube in the discharge chamber to expel the glass charge therefrom, means for lifting said tubes and for simultaneously segregating the attenuated glass from the charging tube and the gob from the feeder tube, and means for swinging said tubes through an angle of 180° to alternate the steps of charging and discharging of the tubes.

2. Apparatus for segregating mold charges from a mass of molten glass comprising a forehearth having an extension chamber beyond the area of the glass, a discharge orifice at the bottom of said extension chamber, a plurality of feeder tubes within the forehearth one of which is disposed in alinement with the discharge orifice and the other over the surface of the glass in the forehearth chamber, means for drawing glass charges into the latter tube and for expelling the charges from the tube over the discharge orifice, and means for alternately contacting said tubes with the molten glass.

3. Apparatus for segregating mold charges from a mass of molten glass comprising a forehearth structure containing molten glass having an end chamber extending beyond the glass, said end chamber having a discharge orifice at the bottom thereof, a dipping head carying a plurality of feeder tubes which in one position are in alinement with a discharge orifice of said end chamber and in their other position in communicable relation to the glass supply, means for dipping the tubes into the glass to draw mold charges therefrom, means for severing the attenuated glass, and means for moving said charged tubes into alinement with the discharge orifice of the end chamber to expel the charge therefrom.

4. Apparatus for segregating mold charges from a mass of molten glass comprising a forehearth having an extension chamber extending beyond the glass pool therein, said chamber having a discharge orifice at the bottom thereof, means for maintaining a substantially uniform temperature in the forehearth chamber and in said extension chamber, a dipping head operative in said forehearth having a pair of feeder tubes which in one position are in communicable alinement with the glass in the forehearth and in their other position in alinement with the discharge orifice of the extension chamber, means for reciprocating said head to dip one of the tubes into the glass to draw a charge therefrom and for simultaneously discharging the glass from the tubes in alinement with the discharge orifice, and means responsive to said reciprocating movement for actuating shearing mechanism for severing the attenuated glass of the charging tube and for severing the gobs from the discharge tube.

5. A glass feeding implement comprising a rotatable block carrying a plurality of feeder tubes spaced from the axis of rotation of said block, conduits connecting said tubes to a valve leading to sources of negative and positive pressure, means for vertically reciprocating the block and said valve, means for subjecting said block to angular movement while in its raised position, and means responsive to the reciprocating and angular movements of the feeder block for controlling the application of positive and negative pressures to said feeder tubes.

6. Apparatus for segregating mold charges from a mass of molten glass comprising an enclosed supply hearth supporting a pool of glass, a dipping head operative within the enclosure of said hearth, a plurality of feeding tubes supported by said head adapted to alternately engage the pool of molten glass to procure and independently support a charge of glass, means for subjecting said head to reciprocatory movement, actuating means independent of said first named means for subjecting the head to angular movement, conduits connecting the feeder tubes to sources of positive and negative pressures, valve means controlling the connection of said conduits, severing mechanism disposed for registration with the feeder tubes, and a control means for regulating said reciprocating and actuating means and for controlling the movement of said valve means to subject the head to a dipping action to receive mold charges from the glass pool and to sever the attenuated glass therefrom, and to move the feeder tubes containing the molten glass to a discharge position in the order stated.

7. Apparatus for segregating and delivering mold charges from a mass of molten glass to a ware-forming machine comprising a ware forming machine, an enclosed heating chamber adjacent said forming machine containing a supply of molten glass and having a discharge opening therein out of contact with the glass, a dipping head operative within the chamber having feeder tubes mounted therein, shear mechanism disposed in cooperative alinement with said tubes, means for supplying negative and positive pressures within said tubes, means for actuating the head to subject it to reciprocating movement in a vertical direction and independent means for subjecting it to angular movement, valve means controlling the application of negative and positive pressures to said tube, and a common control means for regulating the movements of said head and for controlling the movement of the ware-forming machine whereby the head is lowered to effect contact of one of the feeder tubes with the glass pool to withdraw a mold charge therefrom, means responsive to the reciprocatory movement of the head for actuating said shear mechanism to sever the attenuated glass and the glass fed from said tubes whereby a gob of predetermined shape and weight is discharged into a mold of said ware-forming machine which has been moved into alinement with the feeding tubes.

8. A dipping head for obtaining mold charges from an enclosed glass pool having a plurality of hollow glass gathering and feeding tubes adapted to contact with the glass in the pool, means for reciprocating said head into and away from the glass, and means for varying the speed and distance of travel of said head in its reciprocating movement to adapt the tubes to contact the glass at varying levels, means for subjecting said head to angular movement independently of said reciprocating means, a source of negative and positive pressure connected to the feeding tube, and valve means controlled in response to movement of said head for controlling the application of pressures to said tubes.

9. Apparatus for segregating mold charges from a mass of molten glass comprising a forehearth structure for supporting a pool of molten glass, a dipping head operative therein having feeder tubes extending therefrom, glass severing means in cooperative alinement with said tubes means connecting said tubes to a source of negative and positive pressure, a valve controlling the application of such pressures to said tubes, means for subjecting the dipping head to intermittent movement in a vertical direction, and means for subjecting the same to angular movement, and a master control for coordinating the movements of the dipping head and the application of pressures to said feeder tube in such manner that the head will be stationary when vacuum is applied to one of the tubes to gather a charge of glass from the molten glass while glass is discharged from another of said tubes, subject the head to lifting movement while applying vacuum to the discharge tube to neck the glass extruded therefrom and subsequently to sever the attenuated glass from the charging tube and the extruded glass from the discharge tube while the head is held stationary, subject the head to angular movement while applying negative pressure to the tubes to hold the glass charges therein, lower the tubes while the pressures therein are so held, and again subject the alternate tubes to vacuum and pressures to charge one tube and discharge the glass from the other to complete the cycle of operation.

10. A method of feeding glass which comprises charging the glass into a feeding tube by evacuating said tube, lifting the tube out of contact with the glass supply and segregating the glass therefrom, and discharging glass from said tube while maintaining the tube at substantially the temperature of the glass in the supply source.

11. The method of feeding glass which comprises initially lifting and subsequently severing a confined mass of glass from a molten glass source and thereafter subdividing the segregated mass into a mold charge of predetermined weight and shape.

12. The method of feeding glass which comprises lifting and subsequently severing a confined mass of glass from a source of molten glass and thereafter subdividing the segregated mass into mold charges of regulable weight and shape while maintaining the segregated and subdivided charges at substantially the same temperature as the temperature of the glass supply.

13. The method of feeding glass which comprises lifting and subsequently severing a confined mass of glass from a supply of molten glass and thereafter subjecting such segregated mass to an inertia force to partially shape the mass into a gob of predetermined shape and weight and then severing the shaped mass.

14. The method of feeding glass which comprises lifting and subsequently severing a mass of glass from a source of glass supply thereafter subjecting such mass simultaneously to an inertia force produced independent of any natural movement of the mass while admitting air pressure to the segregated mass to form a gob of predetermined shape and weight and then severing such gob from the segregated mass.

15. The method of feeding glass which comprises gathering a mass of glass from a source of supply in a hollow container having an opening at the bottom and segregating the same, subjecting the segregated mass simultaneously to an inertia force and air pressure to form a gob of predetermined shape and weight and severing the gob from the segregated mass while hanging freely from said container before any substantial attenuation of the gob by the force of gravity.

16. The method of procuring, severing and delivering molten glass mold charges from within a heated enclosure which comprises dipping a hollow implement into a source of molten glass at a charging station, subjecting the implement to subatmospheric pressure to draw in a charge of glass, lifting the implement above the source of glass, severing the glass at the charging station, moving the implement to a delivery station, and subjecting the glass in the implement to superatmospheric pressure at the delivering station to partially extrude the glass therefrom, and subsequently severing a mold charge from the extruded mass.

17. Apparatus for segregating mold charges from a mass of molten glass, comprising in combination an enclosed heating chamber having a hearth for supporting a pool of glass and having a discharge outlet adjacent said hearth, a feeding tube adapted to be lowered into contact with the glass source, severing means for the glass disposed between the pool of glass and tube, means for drawing a charge of glass into said tube, means for lifting the tube and subsequently severing the attenuated glass from the bottom thereof, means for moving the raised tube within the heating chamber into alinement with the discharge orifice, means for expelling a charge of glass from said tube and means disposed between the tube and the orifice for severing mold charges from the glass expelled from said tube.

18. Apparatus for segregating mold charges from a mass of molten glass comprising a forehearth structure supporting a pool of glass and a discharge orifice spaced from said pool, a closure over the glass and orifice, a suction mold adapted to be lowered into contact with the glass in the pool to draw a charge of molten glass into the mold, means for severing the charge from the glass in the pool, means for moving the mold within said closure into alinement with the discharge orifice to deliver the glass to a forming mold, and means for heating said closure.

19. Apparatus for segregating mold charges from a mass of molten glass comprising an enclosed forehearth structure containing a forbay for the glass and a communicating juxtaposed chamber, said chamber having an open discharge orifice at the bottom thereof, damper regulated means for selectively controlling the flow of hot gases within the forehearth structure at the forebay and communicating chamber thereof, a dipping head operatively disposed in the forehearth and having a pair of feeding tubes in spaced relation to register with the glass pool in the forbay and the glass discharge orifice of the communicating chamber, means for subjecting said dipping head to reciprocatory and angular movements to alternately bring the feeder tubes in contact with the molten glass and in register with the discharge orifice, and means responsive to the movement of said dipping head controlling the application of negative and positive pressures to the feeder tubes to charge glass into said tubes and discharge the glass therefrom, said pressure controlling means being operative to discharge glass from one of said tubes simultaneously with the charging of the glass into the other of said tubes, and means also responsive to the movements of said dipping head for severing the attenuated glass from the charging tube and the extruded glass from the discharge tube.

20. A dipping head for glass gathering and feeding tubes comprising a shaft and feeding tubes attached thereto, a sleeve on said shaft having ported passages connecting to the feeding tubes, an air pressure and vacuum supply cylinder cooperating with the sleeve and having ports leading to sources of negative and positive pressures, means for subjecting the shaft to reciprocating movement, means for subjecting the shaft to angular movement and independent means for subjecting the cylinder to angular movement to control the relative position of the sleeve and cylinder ports to regulate the admission of positive and negative pressures within the tubes in accordance with the reciprocatory and angular movements of said dipping head.

21. The method of feeding glass which comprises providing a feeder tube having a discharge orifice at the bottom thereof, dipping said tube into a pool of molten glass to draw a charge of glass therefrom, severing the charge from the glass in the pool, subjecting the segregated mass in the tube to a force to cause a partial extrusion of the mass at the discharge orifice to form a gob of predetermined weight and shape and thereafter severing said gob.

22. The method of procuring and delivering mold charges of molten glass from a heated chamber having a source of molten glass supply and maintaining a uniform viscosity throughout the glass during procuration and delivery, which comprises procuring the glass and confining it in an implement within an enclosed heated chamber, severing the glass from the parent mass within the chamber, delivering the charge to a discharge station and segregating said charge into mold charges of predetermined weight.

23. Apparatus for procuring mold charges of molten glass from the upper surface of a pool, comprising an enclosed heated chamber having an extension beyond its glass supporting surface with an outlet opening a charge gathering feeder tube movable in said chamber, means for dipping said tube into the pool from above to obtain a charge of glass and to lift the charged tube above the glass, severing means adapted to operate between the raised tube and the pool to separate the glass in the tube and pool, means to adjust the extent of lift of the tube above the pool and means for moving the feeder tube into register with the opening in the extension of the chamber by a rotary movement.

24. The method of feeding glass which comprises initially filling an implement connected to a source of vacuum, lifting and subsequently severing a mass of glass from a molten glass source and thereafter extruding the desired portion of the mass from the implement and subdividing the mass into a mold charge of predetermined weight and shape.

25. The method of feeding glass which comprises charging glass into a hollow implement, lifting and subsequently severing the mass of glass in the implement from a supply of molten glass and thereafter subjecting the mass to an inertia force to partially extrude the mass from the implement in a gob of predetermined shape and weight and then severing the extruded mass.

26. The method of feeding glass which comprises charging glass into a hollow implement, lifting and subsequently segregating the charged mass from the source of supply, thereafter subjecting such mass simultaneously to an inertia force by quickly dropping the implement while admitting air pressure to the implement to extrude a gob of predetermined shape and weight and then severing such gob from the segregated mass.

27. The method of feeding glass which comprises providing a feeder tube having a discharge orifice at the bottom thereof, dipping said tube into a pool of molten glass to draw a charge of glass therefrom into the tube, raising the tube above the pool of glass to form an attenuated connection between the pool and glass in the tube, severing the attenuated glass from the bottom of the tube, moving the tube to a discharge station, subjecting the mass in the tube to a force to cause a partial extrusion of the mass from the tube and severing the mass to form a detached gob of predetermined shape and weight adapted for free delivery to a forming machine.

28. Apparatus adapted for operation entirely within the uniformly heated thermal environment of an enclosed chamber for procuring mold charges of molten glass from the upper surface of a pool of glass, comprising a charge gathering vacuum type feeder tube, means for dipping said tube into the pool from above to draw in a charge of glass, means to lift the charge above the pool, means moving the tube to a delivery station located within the heated chamber by a horizontal movement of the tube and means to adjust the extent of immersion of the feeder tube into the pool to procure charges without varying the range of reciprocation.

PAUL L. GEER.
HAROLD A. MOORE.
WILLIAM A. MORTON.